United States Patent [19]

Steffen

[11] 4,052,003
[45] Oct. 4, 1977

[54] LIQUID SPREADER CONTROL SYSTEM

[75] Inventor: Ronald W. Steffen, Chatham, Ill.

[73] Assignee: Dickey-john Corporation, Auburn, Ill.

[21] Appl. No.: 712,146

[22] Filed: Aug. 6, 1976

[51] Int. Cl.$^2$ ............................................. B05B 12/00
[52] U.S. Cl. ..................................... 239/71; 239/155; 239/170
[58] Field of Search ..................................... 239/67–69, 239/71–74, 76, 155, 156, 170; 222/52

[56] References Cited

U.S. PATENT DOCUMENTS

| | | | |
|---|---|---|---|
| 3,266,728 | 8/1966 | Hallberg | 239/156 X |
| 3,344,993 | 10/1967 | Wilder et al. | 239/156 X |
| 3,782,634 | 1/1974 | Herman | 239/156 |
| 3,784,100 | 1/1974 | Kirschmann | 239/156 X |
| 3,853,272 | 12/1974 | Decker et al. | 239/155 |
| 3,877,645 | 4/1975 | Ohgschlaeger | 239/155 |

*Primary Examiner*—Evon C. Blunk
*Assistant Examiner*—Andres Kashnikow
*Attorney, Agent, or Firm*—Olson, Trexler, Wolters, Bushnell & Fosse, Ltd.

[57] ABSTRACT

An automatic control system for use with a vehicular liquid sprayer of the type which pumps the liquid to be sprayed at a desired pressure to a plurality of nozzles which dispense the liquid at a predetermined desired density relative to the area being sprayed, with the density being a function of a plurality of liquid spraying parameters which may vary from one spraying application to another or from time to time during a given spraying application. A pressure transducer senses the pressure of the liquid supplied to the nozzles and develops a corresponding electrical liquid pressure signal. A ground speed sensor measures the speed of the vehicular sprayer and develops a corresponding electrical ground speed signal. Programming means are coupled to the ground speed sensor for selectively modifying the ground speed signal to obtain a modified ground speed signal having a characteristic which corresponds to the values of at least two of the liquid spraying parameters required to obtain the desired density. A difference amplifier is responsive to the liquid pressure signal and the modified ground speed signal for generating a corresponding valve control signal. A control valve is operatively coupled to the nozzles and is responsive to the valve control signal for adjusting the rate of flow of the liquid to the nozzles to maintain the pressure of the liquid at the nozzles at a level which corresponds to the selected values of the liquid spraying parameters to thus spray the liquid at the desired density.

26 Claims, 7 Drawing Figures

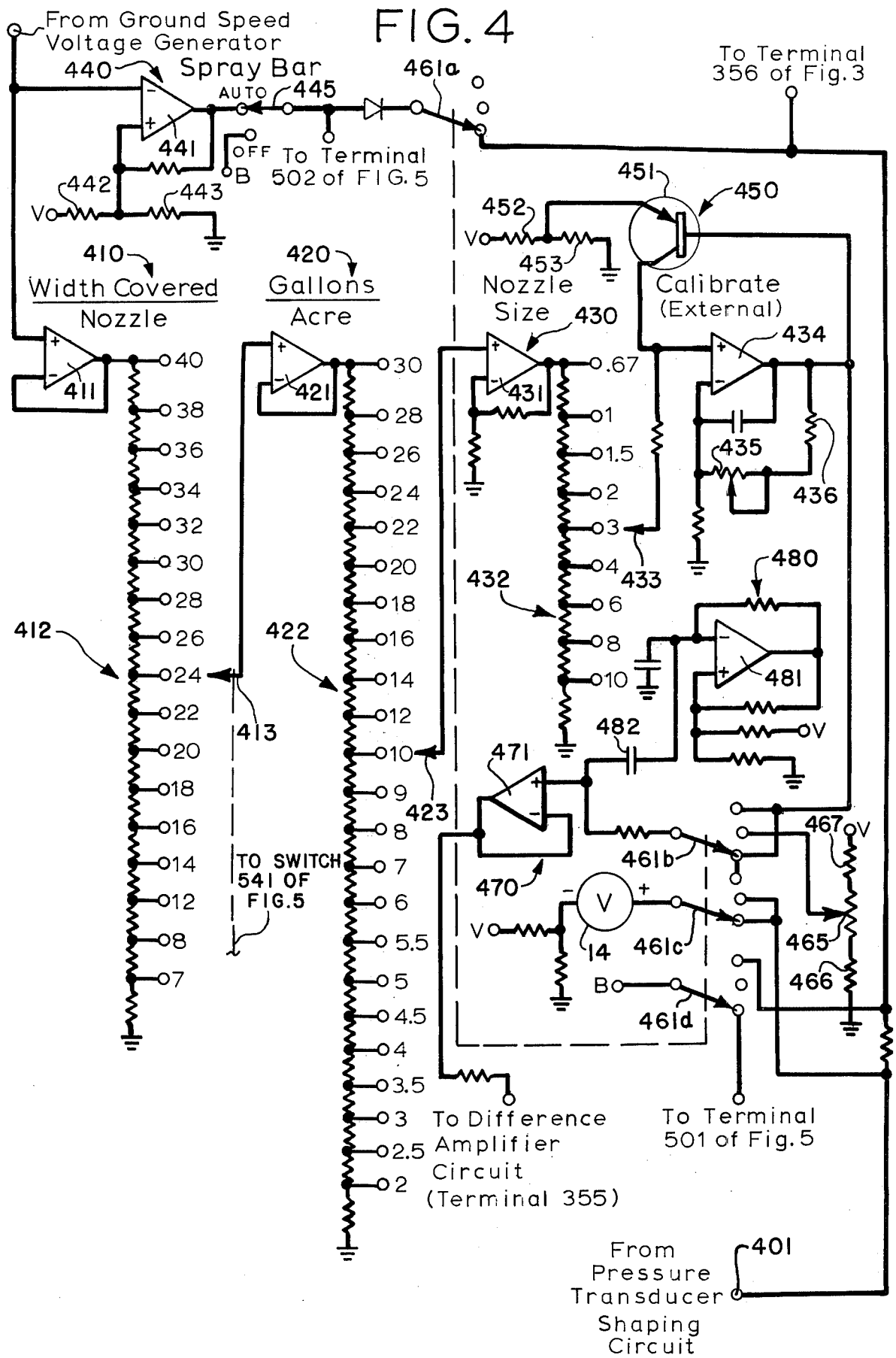

LIQUID SPREADER CONTROL SYSTEM

BACKGROUND OF THE INVENTION

The present invention relates generally to vehicular liquid sprayers and, more particularly, to an improved automatic control system therefor.

The problems involved with spreading a liquid product from a vehicular sprayer in such a manner as to provide a relatively uniform density of sprayed liquid have long been recognized. A particularly attractive solution to the problem may be found in U.S. Pat. No. 3,877,645 — Oligschlaeger, which is assigned to the same assignee as the present invention. The system disclosed therein has been found to work very well in controlling the pressure at the nozzles as a function of vehicle speed in order to maintain a preset spread density of liquid irrespective of variations in the speed of the vehicular sprayer.

Although the Oligschlaeger system performs quite well, it does have some characteristics which might be improved for certain spraying applications. For example, a digital readout of the area of ground sprayed is sometimes very useful. In addition, the operator of the sprayer in some instances may desire to quickly change the nozzle size, rate of flow, or the number of nozzles used without taking the time to consult charts, tables, or instruction sheets.

It is therefore an object of the present invention to provide a new and improved automatic control system for a vehicular liquid sprayer.

It is a further object of the invention to provide such an automatic control system which may be operated rather easily without the need to consult charts, tables, or instruction sheets.

It is a further object of the invention to provide such an automatic control system which also gives a visual readout of the total area sprayed by the vehicular liquid sprayer.

SUMMARY OF THE INVENTION

In accordance with the invention, a new and improved automatic control system for use with a vehicular liquid sprayer of the type which pumps the liquid to be sprayed at a desired pressure to a plurality of nozzles which dispense the liquid at a predetermined desired density relative to the area being sprayed comprises means for sensing the pressure of the liquid supplied to the nozzles and developing a corresponding electrical liquid pressure signal. Means are provided for measuring the ground speed of the vehicular sprayer and developing a corresponding electrical ground speed signal. Programming means coupled to the ground speed sensing means are employed for selectively modifying the ground speed signal to obtain a modified ground speed signal having a characteristic which corresponds to the values of two liquid spraying parameters required to obtain the desired density. Also provided are means responsive to the liquid pressure signal and the modified ground speed signal for generating a corresponding valve control signal. Control valve means operatively coupled to the nozzles and responsive to the valve control signal are utilized for adjusting the rate of flow of the liquid to the nozzles to maintain the system pressure at the nozzles at a level which corresponds to the selected values of the liquid spraying parameters to thus spray the liquid at the desired density.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings in the several figures of which like reference numerals identify like elements and in which:

FIG. 4 is an electrical schematic diagram of the circuit of the pressure programming circuit of the embodiment of the invention illustrated in FIG. 3;

DETAILED DESCRIPTION

Figure 1:
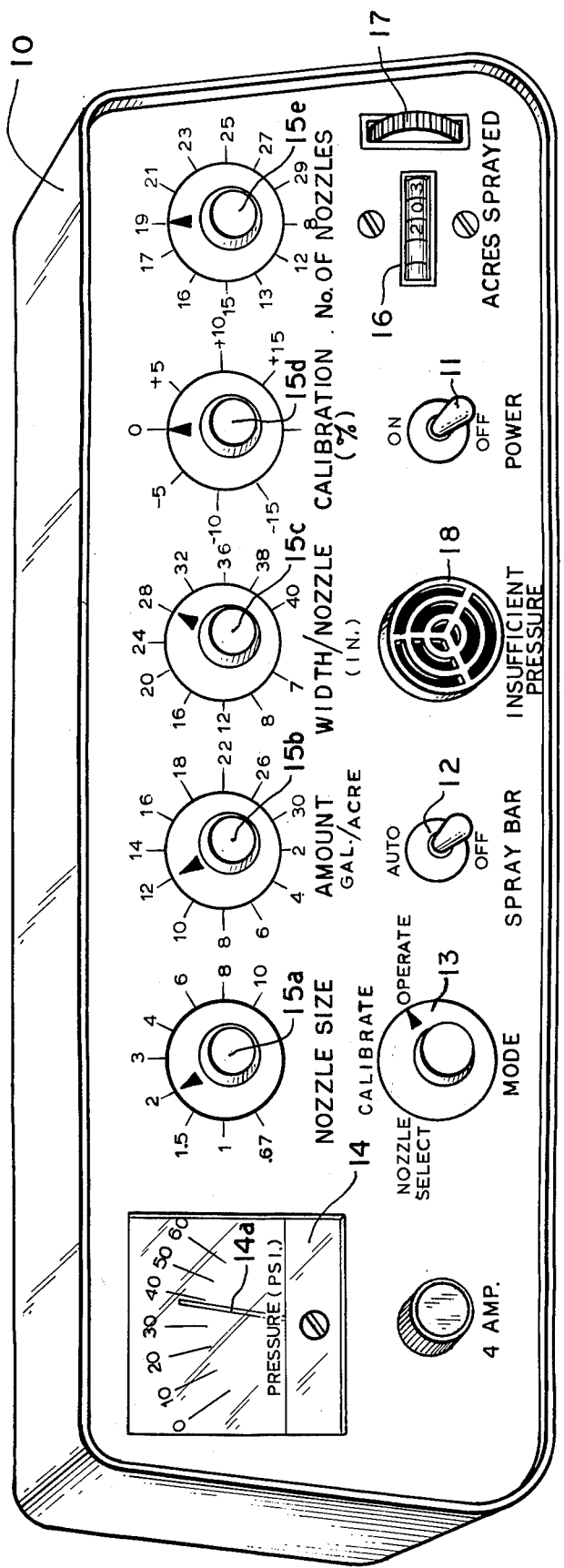
FIG. 1 is a perspective view of the control console in which a preferred embodiment of the invention may be housed.

FIG. 1 illustrates a control console which houses a preferred embodiment of the present invention. A power switch 11 is provided to enable the system to be turned on and off. The system is typically powered by the 12-volt storage battery found in most land vehicles, and this supply voltage may be regulated to maintain a relatively stable supply voltage by a voltage regulator circuit such as that illustrated in FIG. 7.

A plurality of control knobs 15a, 15b, 15c, 15d, and 15e are provided to enable the operator to selectively adjust the system in accordance with various spraying parameters including the nozzle size, the amount of liquid sprayed per acre, the width of the liquid sprayed by each nozzle, system calibration, and the number of nozzles used, respectively. Other spraying parameters such as the weight of the liquid may be added when the control system is used with fertilizer apparatus, for example, where weight is a varying factor.

A spray bar switch 12 permits the operator to operate the spray bar in the "auto" mode, in which the system automatically controls the density of the sprayed liquid, or to turn the spray bar off so that the spraying operation may be stopped temporarily such as, for example, when the sprayer is passing over an area not to be sprayed (e.g., a road). A mode switch 13 is provided to selectively enable the system of the invention to be operated in the normal or "operate" mode and a "calibrate" mode in which the pressure of the liquid at the nozzles is maintained at a predetermined constant level for permitting calibration and which is high enough (e.g., 40 PSI) to enable a flushing liquid to be sent through the system to facilitate changing liquids from, for example, a pesticide to a fertilizer. The mode switch further provides a "nozzle select" mode which, in accordance with another feature of the present invention, permits the operator to drive the vehicular sprayer at the desired spraying speed, without spraying the liquid, and adjust the nozzle size control until he obtains a suitable pressure reading on meter 14. Using the nozzle size that gives this reading, he thus knows that the system will automatically control the pressure to obtain the desired density. Thus the need for charts, etc. is eliminated. In other words, in the "nozzle select" mode, meter 14 shows the pressure required for each nozzle size selected at a particular speed being driven. This permits the operator to avoid the need for consulting charts, graphs, or monographs and, instead, more easily and quickly select the correct nozzle size by merely rotating the "nozzle size" control 15a until the needle 14a of meter 14 indicates the proper pressure operating range.

Display means in the form of readout 16 of an electromechanical counter may be employed, for example, to give the operator a relatively precise indication of the number of acres that have been sprayed, in accordance with another feature of the present invention. A zero-set wheel 17 is provided to enable the operator to reset the counter display 16 to zero at the beginning of a spraying operation.

An "insufficient pressure" alarm is provided, in accordance with another feature of the illustrated embodiment of the invention, in the form of an audio alarm 18 to alert the operator that there is not enough pressure to spray the liquid at the desired density such as, for instance, when the spray control valve is completely open, which indicates that for some reason control of the valve has been lost such as when the spray pump lacks sufficient rpm or output capability necessary at a particular ground speed to develop required pressure. Other system malfunctions may also be indicated by the alarm 18.

Figure 2:
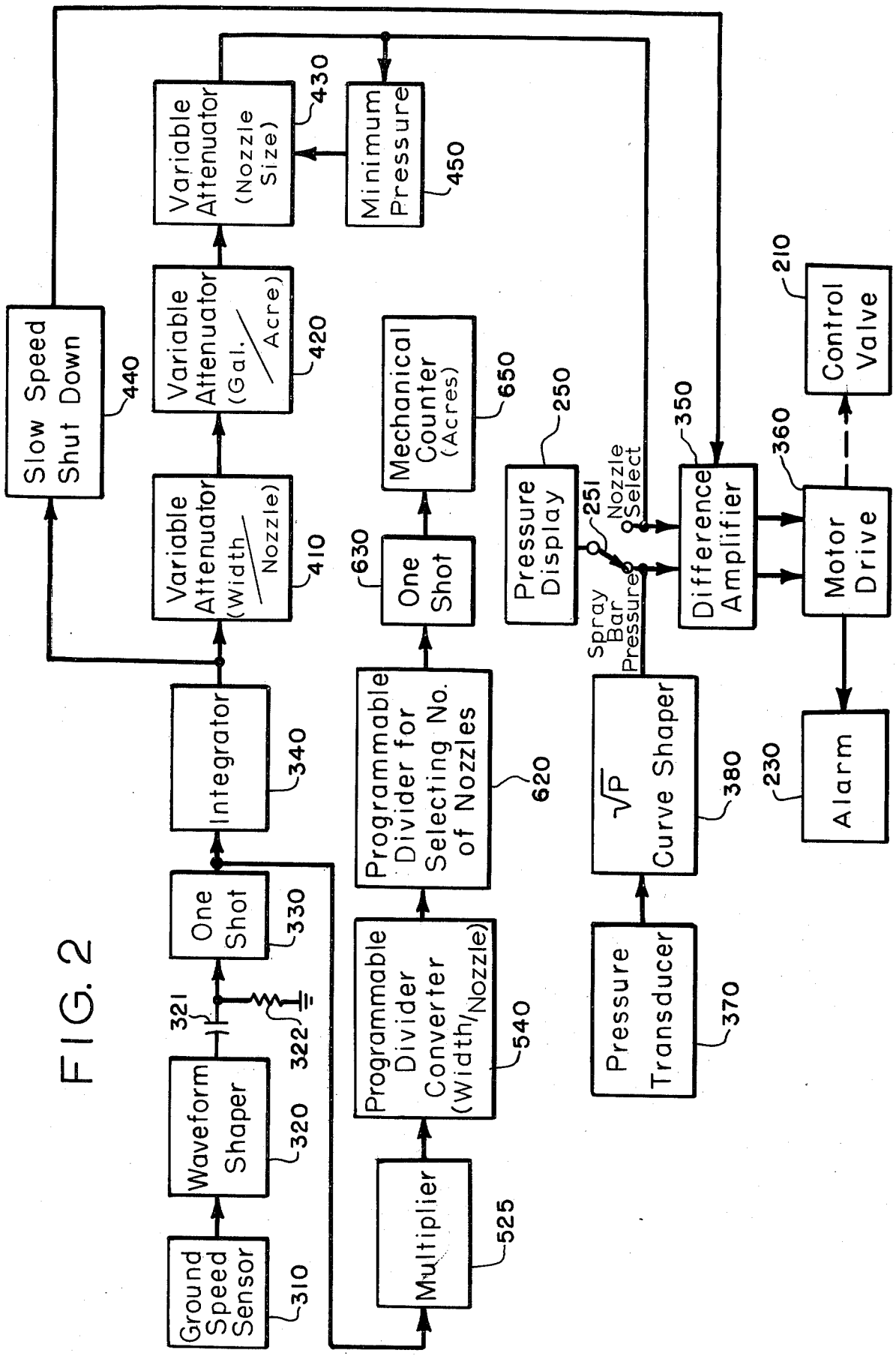
FIG. 2 is a block diagram of the basic systems of a preferred embodiment of the invention.

With reference to FIG. 2, the basic system of a preferred embodiment of the invention is shown in block diagram form in order to give a brief overall picture of the basic construction and operation of the invention. The automatic control system of this embodiment of the invention is primarily intended for use with a vehicular liquid sprayer of the type which pumps the liquid to be sprayed at a desired pressure to a plurality of nozzles which dispense the liquid at a predetermined desired density relative to the area being sprayed, with the density being a function of the ground speed of the sprayer and a plurality of liquid spraying parameters including the rate of flow of liquid, the width covered by each nozzle, and the size of each nozzle. The system includes a ground speed sensor 310 which measures the ground speed of the vehicular sprayer and develops a corresponding electrical ground speed signal. This signal is modified by waveform shape 320 which includes an R-C differentiating network comprising capacitor 321 and resistor 322. The ground speed signal is further shaped by monostable multivibrator or "one-shot" 330 and an integrator 340. Programming means in the form of variable attenuators 410, 420, and 430; a slow-speed shut down circuit 440; and a minimum pressure circuit 450 are coupled to ground speed sensor 310 by means of waveform shaper 320, one-shot 330, and integrator 340 for selectively modifying the ground speed signal to obtain a modified ground speed signal having a characteristic which value corresponds to the value of the rate of flow of liquid, the width covered by each nozzle, and the size of each nozzle.

Simultaneously, a pressure transducer 370 senses the pressure of the liquid applied to the nozzles and develops a corresponding electrical liquid pressure signal. Means in the form of a difference amplifier 350 are responsive to the liquid pressure signal and the modified ground signal for generating a corresponding valve control signal. Control valve means including control valve 210 and a motor drive circuit 360 are operatively coupled to the nozzles (not shown) and responsive to the valve control signal from difference amplifier 350 for adjusting the rate of flow of liquid to the nozzles whereby the vehicular liquid sprayer is automatically adjusted to maintain the system pressure at the nozzles at the level which corresponds to the selected values of the rate of flow, the size of the nozzle, the width sprayed by each nozzle, variations in the ground speed of the sprayer, and fluctuations in the pressure of the liquid supplied to the nozzle to thus spray the liquid at the desired density. As shown in FIG. 2, an alarm circuit 230 may be coupled to motor drive circuit 360 to indicate when a certain undesirable condition occurs (e.g., that control valve 210 is completely open).

Another feature of the illustrated embodiment of the present invention includes a multiplier circuit 525 and a programmable divider circuit 540 for generating an electrical signal representative of the area sprayed by the sprayer. For this purpose, the embodiment of the invention illustrated in FIG. 2 utilizes multiplier 525 which is responsive to the output signal from one-shot 330 for generating a pulse signal having a frequency which varies systematically in accordance with the frequency of the ground speed signal. The circuit further comprises a programmable divider circuit 540 for adjusting the acre counter feature of the invention in accordance with the width of the nozzles and a programmable divider 620 which is responsive to the pulse signal from programmable divider 540 for generating the digital area signal. As discussed hereinafter in greater detail, programmable divider circuit 620 may include a multi-stage binary counter coupled to a diode matrix and having a selector switch connected to the output of the matrix for selecting the output of the divider circuit which corresponds to the number of nozzles being used by the sprayer in a particular application. A one-shot circuit 630 is used to drive display means, illustrated here in the form of a mechanical counter 650, to visually display (via display 16 of FIG. 1) the amount of area sprayed. In the illustrated embodiment of the invention, the area counter has a resolution of one-tenth acre.

A pressure display circuit 250 and a selector switch 251 are employed to enable the operator to selectively read either the actual spray bar pressure at the nozzles or, in the "nozzle select" mode, the required pressure to achieve the proper density for the settings made at the particular ground speed of interest. The operator can thus quite easily select the proper nozzle size for a given spray application.

Figure 3:
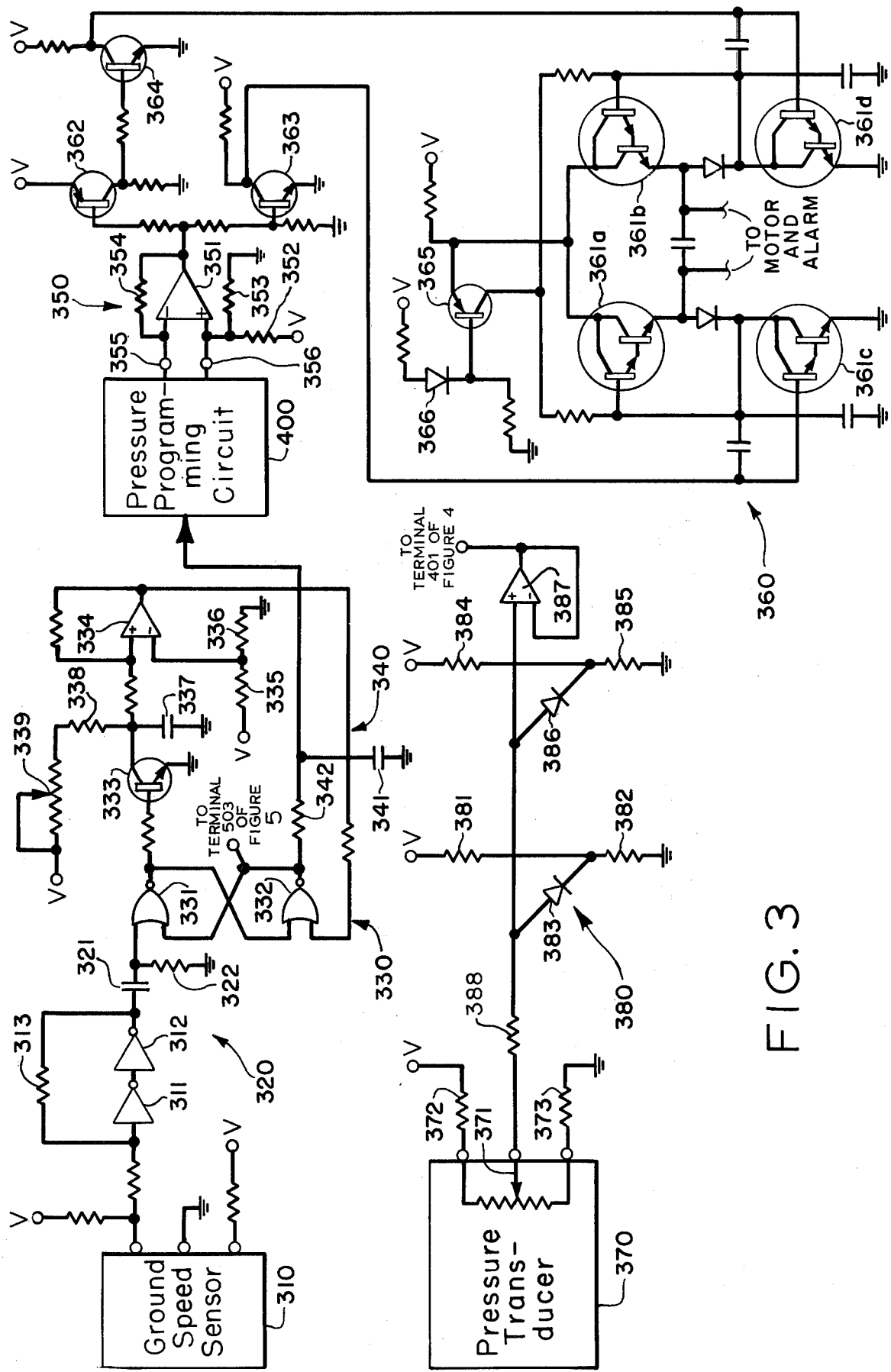
FIG. 3 is an electrical schematic diagram of a portion of a preferred embodiment of the invention.

With reference to FIG. 3, there is shown an electrical schematic diagram of a portion of the circuitry of a preferred embodiment of the invention. The pressure programming circuit 400 is illustrated in block diagram form in FIG. 3 and is discussed in greater detail with reference to FIG. 4. In the circuit of FIG. 3, a ground speed sensor 310 measures the ground speed of the vehicular sprayer and develops a corresponding electrical ground speed signal. For this purpose, any suitable device which develops a digital pulse train signal having a frequency which is systematically related (e.g., proportional) to the ground speed may be employed. For example, an optical switch assembly having a light-emitting diode (LED) light source mounted on one side of a slotted disc which rotates in accordance with a wheel (preferably non-driven to minimize error resulting from wheel slippage) of the vehicular sprayer and a phototransistor light detector mounted on the other side may be used to develop the pulse train signal. In the embodiment of the invention illustrated in FIG. 3, a ground speed sensor having a slotted disc and drive assembly is employed which produces one pulse for every 0.088 feet traveled by the vehicular sprayer. The particular construction of the ground speed sensor forms no part of the present invention and, of course, may be implemented by any suitable conventional equivalent.

The digital pulse train signal developed by ground speed sensor 310 is shaped by a pair of series-coupled inverters 311, 312 having an overall positive feedback path from the output of inverter 312 through resistor 313 to the input of inverter 311. The pulses thus shaped are differentiated by an R-C circuit comprising capacitor 321 and resistor 322 to develop relatively sharp impulses which are applied to the input of a monostable multivibrator ("one-shot") 330 comprising a pair of cross-coupled NOR gates 331 and 332, operated as a flip-flop, and an operational amplifier 334, which is operated as a comparator. An amplifying transistor 333 is coupled between NOR gate 331 and amplifier 334 to provide amplification of the signal and, in conjunction with a potentiometer 339 which is connected as a variable resistor, (as shown in FIG. 3) to provide means for calibrating the timing of one-shot circuit 330. Resistors 335 and 336 are connected in series between the voltage source V and ground, with the junction of resistors 335, 336 being connected to the inverting input terminal of operational amplifier 334 to establish the threshold of the comparator circuit comprising operational amplifier 334. Capacitor 337, resistor 338, and potentiometer 339 serve as the main timing elements of one-shot circuit 330.

The output signal of one-shot circuit 330, which is a rectangular wave for the embodiment of the invention illustrated in FIG. 3, is applied to an R-C integrator circuit 340 comprising capacitor 341 and resistor 342 which integrates the pulses from one-shot circuit 330 to develop a DC voltage having an amplitude which is proportional to the ground speed of the vehicular sprayer. This electrical ground speed signal is applied to pressure programming circuit 400 which modifies the ground speed signal to obtain a modified ground speed signal having a characteristic (e.g., magnitude) which corresponds to the selected rate of flow of liquid, width covered by each of the nozzles, and size of each of the nozzles, as hereinafter discussed in greater detail with reference to FIG. 4.

The modified ground speed signal of programming circuit 400 is applied to difference amplifier 350, along with the liquid pressure signal from pressure transducer 370 which is applied at terminal 356 (also see FIG. 4), to generate a corresponding valve control signal. Difference amplifier 350 comprises operational amplifier 351 operated in the differential mode with the modified ground speed signal being applied to the inverting input terminal 355 of operational amplifier 351 and the liquid pressure signal being applied to the non-inverting input terminal 356. A pair of biasing resistors 352, 353 are used to establish the proper operating bias for operational amplifier 351 as shown in FIG. 3. A feedback resistor 354 is coupled between the output of operational amplifier 351 and its inverting input terminal 355 to provide the proper amount of signal feedback to establish a suitable level of gain (in the illustrated embodiment of the invention, the amplifier is operated with a gain of about 10).

The output of operational amplifier 351 is applied to motor drive circuit 360 to cause the motor to open or close the control valve. Motor drive circuit 360 may also drive an audio alarm (e.g., a Sonalert, manufactured by the Mallory Co.) to indicate that the control valve is in an extreme open position. Neither the motor nor the control valve form a material of the present invention; hence, they are not shown in FIG. 3 nor described in greater detail. The motor may be a suitable permanent magnet DC motor which drives a butterfly valve. Limit switches may be utilized to detect when the valve has reached either its maximum open or closed positions. The limit switches may be used to actuate alarm 18 of FIG. 1. In addition, suitable circuitry may be used with the limit switches to cause the motor to move the valve in the direction opposite that of the actuated limit switch. Motor drive circuit 360 comprises four motor driver transistors 361a, 361b, 361c, and 361d, each of which comprise a Darlington amplifier circuit which may be obtained in commercial form as a three-terminal package such as a "2N6386", which is available from various transistor manufacturers. At the input of motor drive circuit 360, a pair of complementary transistors 362, 363 are used, together with their respective biasing resistors, to establish the switching threshold for the circuit. An additional transistor 364 is coupled to the collector of transistor 362 in order to shift the phase of the output signal thereof before applying it to motor drive transistor 361d. A transistor 365, diode 366, and the associated biasing resistors are employed as shown in FIG. 3 to provide current limiting and thus provide short-circuit protection.

Means for sensing the pressure of the liquid supplied to the nozzles and developing a corresponding electrical liquid pressure signal are illustrated in FIG. 3 in the form of a pressure transducer 370 and a curve-shaping circuit 380. Pressure transducer 370 may of course be implemented with any conventional type of transducer which is suitable for this application. One type which may be used is a potentiometer wherein the position of its movable contact or wiper 371 is mechanically coupled to a diaphragm which is in contact with the liquid and moves in accordance with changes in pressure. Thus, by applying a suitable voltage V to one end of the potentiometer and grounding the other end, as shown in FIG. 3, the voltage at the movable terminal 371 varies in accordance with changes in the pressure on the diaphragm. Resistors 372 and 373 are connected in series with pressure transducer 370 as shown in FIG. 3 to limit the maximum and minimum voltage levels to correspond to pressure, for example, such as zero and 60 pounds per square inch (psi).

Curve-shaping circuitry 380 comprises resistor 388 and four resistors connected in two series pairs, 381, 382 and 384, 385 together with diodes 383 and 386, respectively, to modify the electrical liquid pressure signal developed by pressure transducer 370 to obtain a signal which approximates the square root of the electrical pressure signal. The square root signal is applied to the non-inverting input of an operational amplifier 387 which is operated as a voltage follower for purposes of impedance matching. The output of voltage follower 387 is applied to terminal 401 of FIG. 4 and, in turn, to non-inverting terminal 356 of difference amplifier 350.

FIG. 4 illustrates a preferred embodiment of the circuitry utilized to implement the pressure programming circuit 400 of FIG. 3. Programming means in the form of a plurality of series-connected attenuators 410, 420, and 430 for selectively modifying the ground speed signal to obtain a modified ground speed signal having a characteristic which corresponds to the values of the selected rate of flow of liquid, width covered by each nozzle, and size of each nozzle required to obtain the desired density. Attenuator 410 comprises an operational amplifier 411, which is operated as a voltage follower, and a voltage divider network 412 having a single pole, multi-position switch with a fixed resistance connected between each two adjacent switching positions and a movable contactor 413 for selecting any of said switch positions. In the illustrated embodiment, nozzle widths of from 7 inches to 40 inches may be selected. Movable switch contactor 413 is coupled to the non-inverting input of operational amplifier 421 which has its output coupled to its inverting input to form a voltage follower circuit. The voltage follower is utilized to prevent undue loading of the attenuator circuit. Movable contactor 413 corresponds to control 15c in FIG. 1.

Similarly, attenuator 420 enables the operator to select the amount of liquid sprayed in gallons per acre, from 2 gallons per acre to 30 gallons per acre in the embodiment of the invention illustrated in FIG. 4, and its construction is essentially the same as that of attenuator 410. Attenuator 430 likewise enables the operator to control the system in accordance with nozzle size, from a nozzle size of 0.67 to 10.

Figures 3A, 4A:
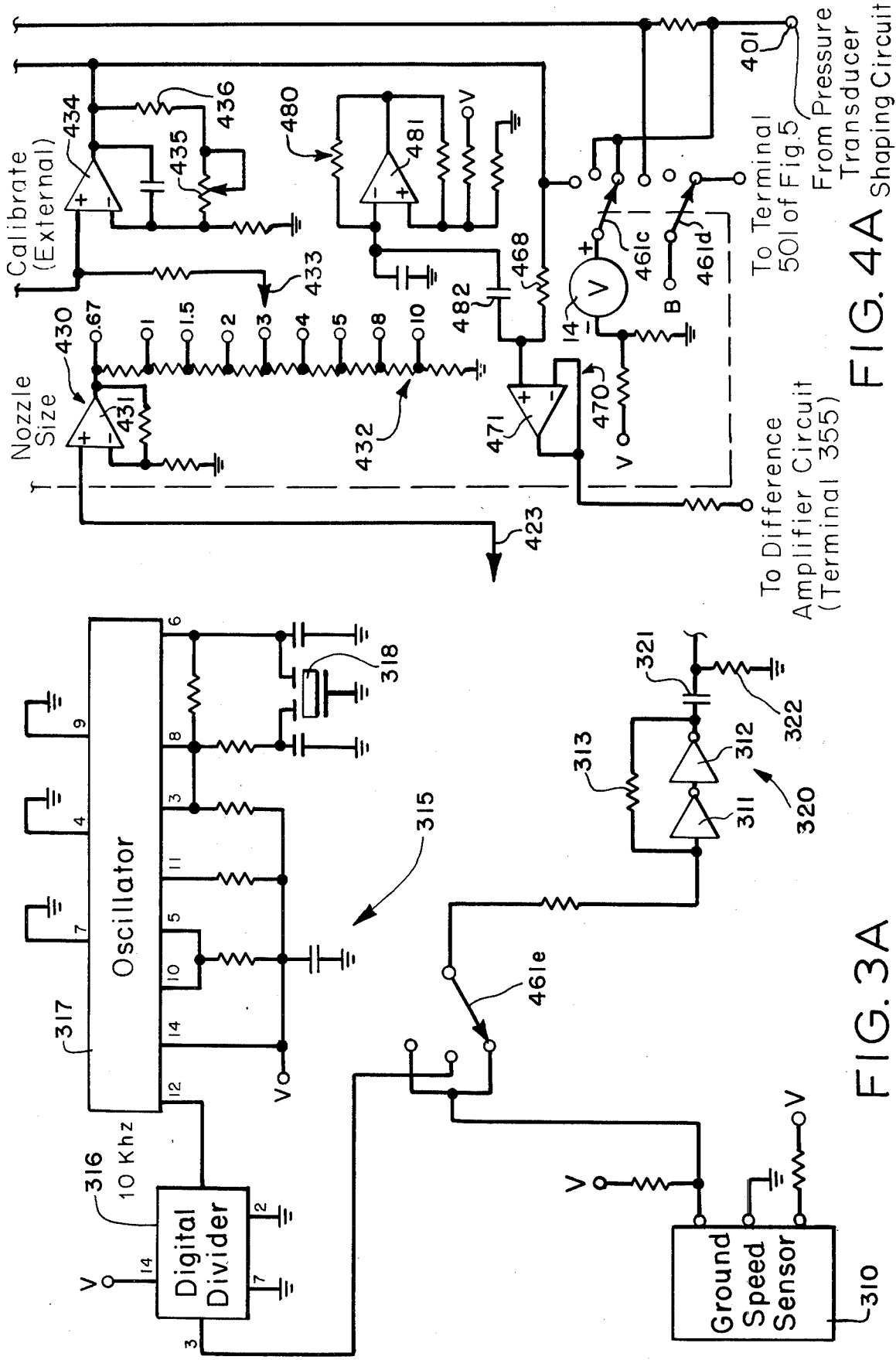
FIG. 3A is an electrical schematic diagram illustrating an alternative modification of the circuit shown in FIG. 3.
FIG. 4A is an electrical schematic diagram illustrating an alternative modification of the circuit shown in FIG. 4.

In each of the attenuators, the gain of the operational amplifier is set as high as possible to minimize offset voltage errors in the amplifiers, with the upper limit being determined by worst-case selection of the parameters and the saturation levels of the operational amplifiers. The typical gain for the illustrated embodiment of the invention is 3.49 for amplifier 431 and 9.15 for amplifier 434. Attenuator 430 further includes a second operational amplifier 434 having a series combination of a potentiometer 435, connected as a variable resistor as shown in FIG. 4, and a fixed resistor 436 connected between the output and the inverting input of operational amplifier 434 to permit the system to be calibrated to compensate for system tolerances or worn nozzles. The mode switch 13 of FIG. 1 is represented in FIG. 4 by a four-pole, three-position switch having four movable contactors or poles 461a, 461b, 461c, and 461d. The upper position of the mode switch of FIG. 4 represents the "nozzle select" mode; the middle position, the "flush" mode; and the lower position, the "operate" mode. As discussed hereinbelow with respect to FIG. 4A, the "flush" mode may be changed to a "calibrate" mode.

In either the "operate" or "nozzle select" modes, the output of operational amplifier 434 is applied to the difference amplifier circuit 350 of FIG. 3 by way of the voltage follower circuit 470 which essentially comprises an operational amplifier 471 having its output coupled to its inverting input. The output of operational amplifier 471 is also coupled to the inverting input terminal 355 of difference amplifier circuit 350 of FIG. 3.

Also coupled to the non-inverting input of operational amplifier 471 is a triangular waveform signal which is developed by triangular waveform oscillator 480. Oscillator circuit 480 comprises operational amplifier 481 which is connected in an oscillator configuration as shown in FIG. 4. The output of oscillator 480 is taken at its inverting input terminal and coupled to the non-inverting input terminal of operational amplifier 471 by a coupling capacitor 482. In the illustrated embodiment of the invention, the amplitude of the triangular waveform signal is approximately 800 milivolts peak-to-peak so that, with the difference amplifier circuit of FIG. 3 being biased to provide a deadband (i.e., an input voltage swing which results in an output voltage that does not cause the motor to move the control valve) on the input side of 650 milivolts, the motor is pulsed such that the signal voltage centers itself in the deadband. This eliminates any error caused by the signal voltage sitting on the edge of the deadband. The gain of operation amplifier 351 is about 10 so that the switching levels are thus 1.00 volts and 7.50 volts. In addition, as the pressure signal amplitude approaches the ground speed input signal amplitude, the motor is pulsed at a duty cycle proportional to the difference of the amplitudes of the two inputs. This technique gives the desired closed-loop system stability as well as obtaining accurate pressure control for very small changes in ground speed or other system parameters.

A minimum pressure circuit 450 is provided in the form of a transistor 451 and its associated emitter biasing resistors 452 and 453 which operate to maintain the output of operational amplifier 434 at a level no lower than a preset minimum level. In the illustrated embodiment of the invention, this level is set to correspond to approximately 10 psi. Consequently, when the system is in the operate mode and the spray bar is in the auto position, the spray bar pressure cannot go below 10 psi until the slow speed circuit 440, comprising an operational amplifier 441 and its associated biasing resistors, 442 and 443, turns the spray bar off completely. This prevents the spray bar from dribbling at a very low pressure. As previously discussed herein, slow speed circuit 440 is responsive to the ground speed dropping below a predetermined minimum level for stopping the spraying. A spray bar switch 445, which corresponds to switch 12 in FIG. 1, is provided to enable turning off the spraying manually.

A meter 14, also shown in FIG. 1, is coupled to mode switch section 461c as shown in FIG. 4 and, in the "operate" and "flush" modes indicates the actual pressure at the nozzles. In the "nozzle select" mode, meter 14 indicates the pressure that is required at the nozzle in order to obtain the desired density of liquid sprayed.

A voltage divider network comprising a potentiometer 465 and two fixed resistors 466 and 467 is employed as shown in FIG. 4 to provide a constant pressure (e.g., 40 psi) input signal to operational amplifier 471 when the system is in the "flush" mode.

Figure 5:
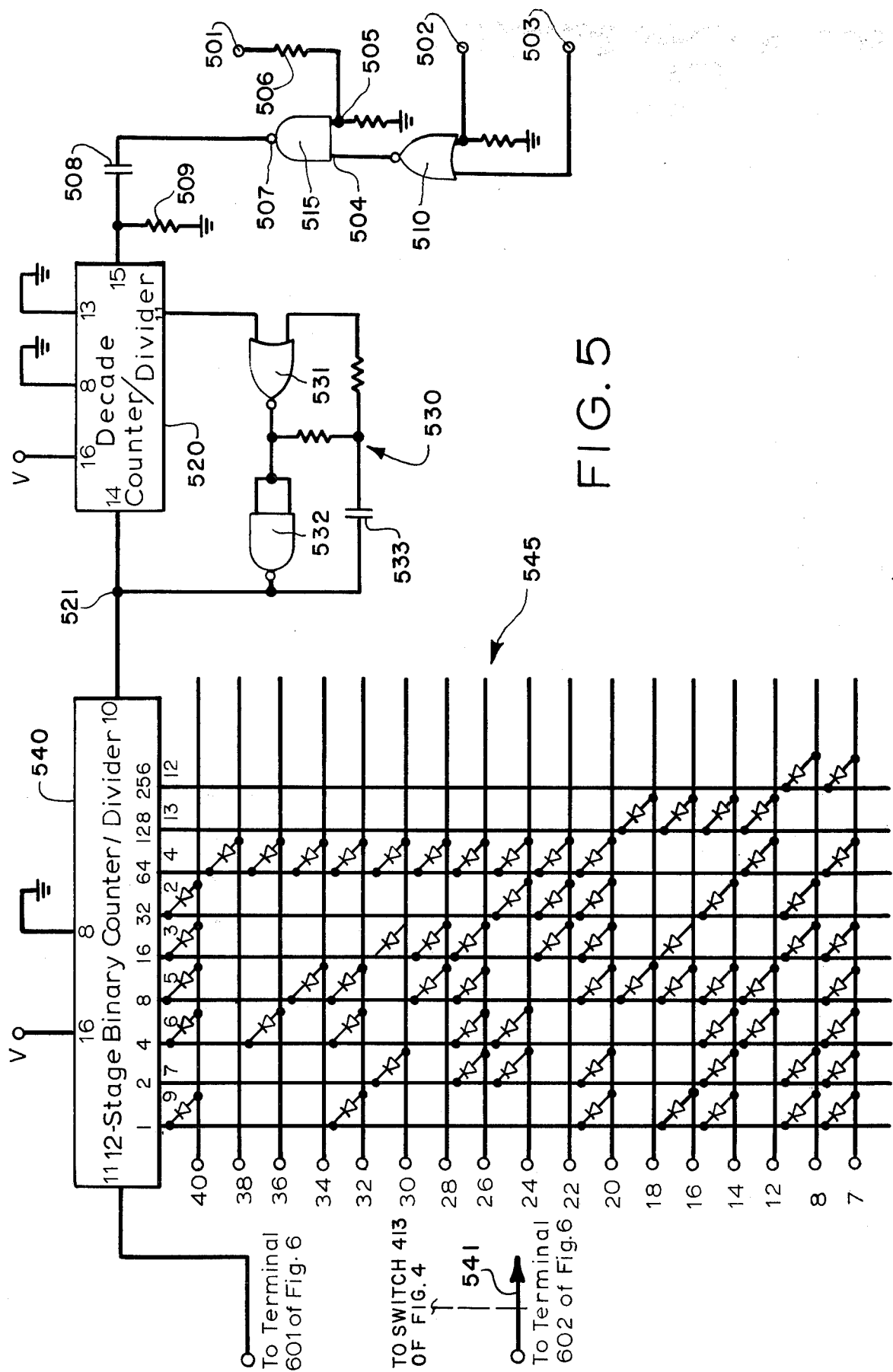
FIGS. 5 and 6 illustrate an electrical schematic circuit diagram of a preferred embodiment of the acre-counter feature of the invention which may be employed with the embodiment of the invention illustrated in FIG. 3.
Figure 6:
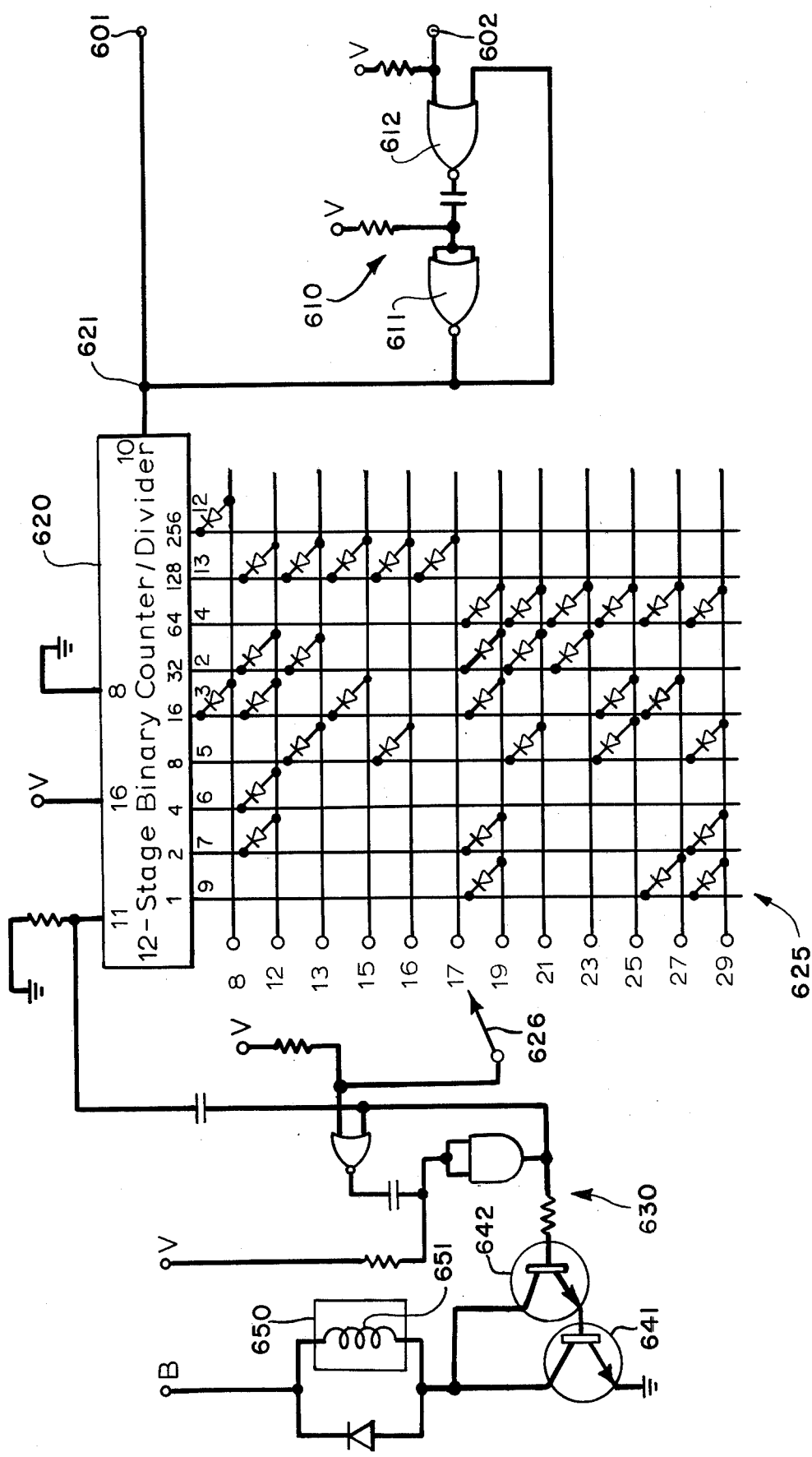

With respect to FIGS. 5 and 6, there is shown an electrical schematic diagram of a preferred embodiment of the acre-counter feature of the present invention which preferably may be utilized with the embodiment of the invention illustrated in FIG. 3. For greater legibility and to facilitate a better understanding of the illustrated embodiment of the invention, the circiut has been divided approximately in half, with one half illustrated in FIG. 5 and the other half shown in FIG. 6. Reference characters 601 and 602 indicate where the portion of the circuit of FIG. 5 is connected to that of FIG. 6.

Input pulses are applied to input terminal 503 of NOR gate 510 from the distance signal one-shot 330 of FIG. 3. The other input terminal 502 of NOR gate 510 is connected to spray bar switch 455 of FIG. 4 to provide an inhibit signal when spray bar switch 445 is turned of or when slow speed shut down circuit 440 is energized. The output of NOR gate 510 is applied to an input terminal 504 of a NAND gate 515. The other terminal 505 of NAND gate 515 is connected, via resistor 506 and terminal 501, to switch contact 461d of the mode switch of FIG. 4 to inhibit the acre-counter circuitry of FIGS. 5 and 6 when the system is in either the "flush" or "nozzle select" mode. Thus the acre-counter circuitry is activated when the system is in the "operate" mode, the spray bar is on, and the vehicular sprayer is traveling above the minimum speed.

The gated clock signal thus developed at output terminal 507 of NAND gate 515 is differentiated by capacitor 508 and resistor 509. The resulting impulse signal resets a decade counter/divider 520 which then counts or "clocks" up to a count of 9 before latching into a stopped position by means of a latching circuit 530. An oscillating circuit comprises a NOR gate 531, a NAND gate 532, and a feedback capacitor 533. A suitable oscillator frequency for the illustrated embodiment of the invention is 4.5 kilohertz. The output of decade counter/divider circuit 520 at terminal 521 is thus the result of multiplying the input signal by 9.

A programmable divider 540 is responsive to the pulse signal at terminal 521 for initially dividing the pulse signal in accordance with the selected value of width covered per nozzle as set by switch 413 of FIG. 4. For this purpose a diode matrix 545 is used to program counter/divider 540 and a selector switch 541 is mechanically coupled to switch 413 of FIG. 4 to select the proper decoded output of counter/divider 540 which fixes the divisor. When the binary output of counter/divider 540 allows all diode cathodes of the line in diode matrix 545 selected by switch 541 to go high, a one-shot circuit 610 is triggered which resets counter/divider 540 and outputs a pulse at terminal 601.

One-shot circuit 610 of FIG. 6 comprises two series-connected NOR gates 611 and 612 which deliver to input terminal 621 of a 12-stage binary counter/divider 620 a pulse of predetermined amplitude and duration for every output pulse from counter/divider 540 of FIG. 5. Counter/divider 620 is quite similar to counter/divider 540 and is also programmed by a diode matrix 625 with a selector switch 626 being provided to select the proper output of counter/divider 620 which fixes the divisor according to the number of nozzles employed in a given spraying application.

When the binary output of counter/divider 620 allows all diode cathodes of the line in diode matrix 625 selected by switch 626 to go high, a one-shot circuit 630 is triggered. Triggering one-shot 630 resets counter/divider 620 by means of a differentiating circuit and, via a pair of cascaded driving transistors 641, 642, drives the coil 651 of an electromechanical counter 650 to advance the counter display one digit.

Decade counter/divider 520 and binary counter/dividers 540 and 620 may be of any suitable conventional construction; however, an integrated circuit known as a "CD 4017" manufactured by RCA, for example, has been found to be especially well adapted for decade counter/divider 520 in the illustrated embodiment of the invention. Similarly, a "CD 4040" is well suited for binary counter/dividers 540 and 620.

Figure 7:
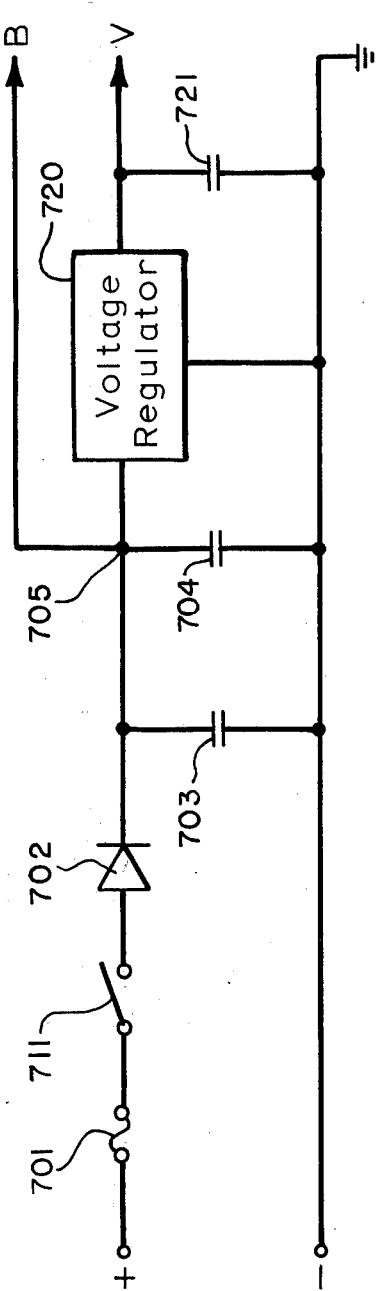
FIG. 7 is an electrical schematic diagram of a voltage regulator circuit which may be employed with the embodiment of the invention illustrated in FIG. 3.

FIG. 7 illustrates a power supply circuit which may be utilized with the embodiment of the invention illustrated in FIGS. 3, 4, 5, and 6. The "+" and "−" terminals of the circuit in FIG. 7 are connected to the corresponding terminals of a conventional 12-volt storage battery (not shown) of the type which is commonly employed in present-day vehicles. Power is applied to the circuit through a fuse 701 by means of an on/off power switch 711 which corresponds to power switch 11 in FIG. 1. A diode 702 is employed as shown to protect the circuit in the event that the "+" and "−" terminals are improperly connected to the battery. A relatively large filter capacitor 703 (e.g., 350 Mfd.) may be used to reduce the effects of transient "spikes" from the vehicle's electrical system and a second, relatively small filter capacitor 704 (e.g., 0.68 Mfd.) may be employed to reduce any tendency for the circuit to oscillate. At terminal 705, a roughly filtered supply voltage "B" is available for relatively non-critical circuits such as the electromechanical counter 650 of FIG. 6. For circuits requiring a more closely regulated supply voltage, such as counter/divider 520, 540, and 620, a voltage regulator circuit 720 in integrated circuit form (e.g., a voltage regulator circuit commonly known as a "7808", manufactured by Fairchild or Motorola, for example) may be utilized as shown in FIG. 7 to provide supply voltage "V" which is used in most instances in the circuits of FIGS. 3, 4, 5, and 6.

With respect to FIG. 3A, there is shown in schematic diagram form an electrical schematic circuit diagram of a modification which may be made to the circuit of FIG. 3 in order to provide a method of calibrating the system of the invention in accordance with another feature thereof. A circuit of FIG. 3A is essentially the same as that of FIG. 3 except for the addition of a digital divider and oscillator circuitry between the ground speed sensor 310 and the waveform shaper circuitry 320. Accordingly, for convenience and to simplify the drawing, the remainder of FIG. 3 is not repeated in FIG. 3A. The particular circuitry illustrated in FIG. 3A enables the system to be calibrated while the vehicular sprayer is stationary, thus providing convenience in some applications of the invention and eliminating the ground speed sensing system as a possible source of calibration error.

In accordance with this feature of the invention, a crystal-controlled oscillator 315 is coupled between ground speed sensor 310 and wave shaper circuit 320. Oscillator 315 comprises a digital divider circuit 316 which may be of any suitable conventional construction; however, an integrated circuit commonly known as a "CD4024" manufactured by RCA has been found to be quite suitable for this purpose. The output of digital divider 316 is applied to the input of an oscillator 317 which likewise may preferably take the form of an integrated circuit commonly known as a "CD4007" and also manufactured by RCA. The frequency of oscillator 317 is controlled by a crystal 318 connected as shown in FIG. 3A. The oscillator circuit 315 is coupled between ground speed sensor 310 and wave shaper circuit 320 by means of a single-pole, triple-throw switch 461e which may preferably be ganged with switch poles 461a, 461c, and 461d of FIG. 4. In certain applications of the invention, as hereinafter discussed in greater detail, switch pole 461b of the circuit of FIG. 4 may be eliminated and, accordingly, switch pole 461b may be used for switch pole 461e of the circuit of FIG. 3A.

The oscillator circuit 315 may preferably be operated at a frequency of 78.125 hertz, which corresponds to 4.688 miles per hour and provides a convenient calibration method in that the operator need only to have a stop watch and a container calibrated in fluid ounces because, with this particular frequency, the time intervals during which liquid is collected may be selected such that the fluid ounces collected correspond on a one-to-one ratio to gallons sprayed per acre. Should the operator of the sprayer desire to spray at a speed substantially different from 4.688 miles per hour, the circuit parameters may be changed to more closely correspond to the speed at which the liquid sprayer will be operated.

With respect to FIG. 4A, there is shown in electrical schematic diagram form an alternative modification which may be made to the circuit of FIG. 4. As with FIG. 3A, FIG. 4A relates only to a portion of FIG. 4 and, therefore, only that portion of the circuit is shown in FIG. 4A. Specifically, the circuit of FIG. 4A deletes switch pole 461b, resistors 465, 466, and 467 and permanently connects a resistor 468 between the non-inverting input of operational amplifier 471 and the output of operational amplifier 434. With this change, the function of maintaining the nozzle pressure at a predetermined constant level (e.g., 40 p.s.i.) is eliminated because it is no longer necessary with the calibration circuitry illustrated in FIG. 3A.

Thus the invention provides a new and improved automatic control system for automatically maintaining the pressure at the nozzles at the level required to spray the liquid at the desired density. The device of the invention is relatively simple to operate and is easily adaptable to spraying implements of various widths, nozzle sizes, number of nozzles, liquid weights, etc. without requiring the operator to consult charts, graphs, or the like.

While a particular embodiment of the invention has been shown and described, it will be obvious to those skilled in the art that changes and modifications may be made without departing from the invention in its broader aspects and, therefore, the aim of appended claims is to cover all such changes and modifications as fall within the true spirit and scope of the invention.

The invention is claimed as follows:

1. An automatic control system for use with a vehicular liquid sprayer of the type which pumps the liquid to be sprayed at a desired pressure to a plurality of nozzles which dispense the liquid at a predetermined desired density relative to the area being sprayed, said density being a function of a plurality of liquid spraying parameters which may vary from one spraying application to another or from time to time during a given spraying application, said control system comprising: means for sensing the pressure of the liquid supplied to said nozzles and developing a corresponding electrical liquid pressure signal; means for measuring the ground speed of said vehicular sprayer and developing a corresponding electrical ground speed signal; programming means coupled to said ground speed measuring means for selectively modifying said ground speed signal to obtain a modified ground speed signal having a characteristic which corresponds to the values of at least two of said liquid spraying parameters required to obtain said desired density; means responsive to said liquid pressure signal and said modified ground speed signal for generating a corresponding valve control signal; and control valve means operatively coupled to said nozzles and responsive to said valve control signal for adjusting the rate of flow of said liquid to said nozzles to adjust the pressure of the liquid at the nozzles in accordance with said valve control signal, whereby the vehicular liquid sprayer is automatically adjusted to maintain the system pressure at the nozzles at the level which corresponds to the selected values of the liquid spraying parameters to thus spray the liquid at the desired density.

2. An automatic control system in accordance with claim 1, in which said programming means comprises a plurality of series-connected attenuators coupled between said ground speed measuring means and said valve control signal generating means, each said attenuator respectively associated with one of said liquid spraying parameters.

3. An automatic control system in accordance with claim 2, in which each said attenuator includes a voltage divider network having a single-pole, multi-position switch with a fixed resistance connected between each two adjacent switch positions and a movable contactor for selecting any of said switch positions, and which further includes an operational amplifier having its non-inverting input terminal connected to said movable contactor and its inverting input terminal connected to its output terminal to form a voltage follower.

4. An automatic control system in accordance with claim 1, which further comprises calibration means coupled between said ground speed measuring means and said valve control signal generating means for modifying said ground speed signal to compensate for variations in system tolerances.

5. An automatic control system in accordance with claim 1, which further comprises visual indicator means coupled to said pressure sensing means and responsive to said electrical liquid pressure signal for visually indicating the pressure of the liquid at said nozzles.

6. An automatic control system in accordance with claim 5, which further comprises switch means coupled between said visual indicator means and said pressure sensing means and said programming means for enabling said visual indicator means to selectively indicate the pressure of the liquid at said nozzles and the magnitude of said modified ground speed signal.

7. An automatic control system in accordance with claim 1, which further comprises means coupled to said programming means for preventing said modified ground speed signal from attaining a characteristic which corresponds to a vehicular ground speed below a predetermined speed, whereby the pressure of the liquid at the nozzles is maintained at least equal to a predetermined threshold level when the vehicular spreader is traveling at relatively slow speeds.

8. An automatic control system in accordance with claim 1, which further comprises alarm means; and sensing means coupled between said control valve means and said alarm means for sensing when said control valve means is at an extreme position and activating said alarm means.

9. An automatic control system in accordance with claim 1, which further comprises means coupled to said ground speed measuring means and responsive to said electrical ground speed signal for generating an electrical area signal representative of the area sprayed by said sprayer; and display means responsive to said electrical area signal for visually displaying the amount of area sprayed.

10. An automatic control system for use with a vehicular liquid sprayer of the type which pumps the liquid to be sprayed at a desired pressure to a plurality of nozzles which dispense the liquid at a predetermined desired density relative to the area being sprayed, said density being a function of the ground speed of the sprayer and a plurality of liquid spraying parameters including the rate of flow of liquid, the width covered by each nozzle, and the size of each nozzle, said control system comprising: means for sensing the pressure of the liquid supplied to said nozzles and developing a corresponding electrical liquid pressure signal; means for measuring the ground speed of said vehicular sprayer and developing a corresponding electrical ground speed signal; programming means coupled to said ground speed measuring means for selectively modifying said ground speed signal to obtain a modified ground speed signal having a characteristic which corresponds to the values of said rate of flow, said nozzle width, and said nozzle size required to obtain said desired density; means responsive to said liquid pressure signal and said modified ground speed signal for generating a corresponding valve control signal; and control valve means operatively coupled to said nozzles and responsive to said valve control signal for adjusting the rate of flow of said liquid to said nozzles to maintain the pressure of the liquid at the nozzles at a level which corresponds to said valve control signal, whereby the vehicular liquid sprayer is automatically adjusted to maintain the system pressure at the nozzles at the level which corresponds to the selected values of rate of flow, nozzle width, nozzle size, and variations in the ground speed of the sprayer and fluctuations in the pressure of the liquid supplied to the nozzles to thus spray the liquid at the desired density.

11. An automatic control system in accordance with claim 10, in which said programming means comprises a plurality of series-connected attenuators coupled between said ground speed sensing means and said valve control signal generating means, said attenuators respectively associated with said rate of flow, nozzle width, and nozzle size.

12. An automatic control system in accordance with claim 11, in which each said attenuator includes a voltage divider network having a single-pole, multi-position switch with a fixed resistance connected between each two adjacent switch positions and a movable contactor for selecting any of said switch positions, and which further includes an operational amplifier having its non-inverting input terminal connected to said movable contactor and its inverting input terminal connected to its output terminal to form a voltage follower.

13. An automatic control system in accordance with claim 10, which further comprises calibration means coupled between said ground speed measuring means and said valve control signal generating means for modifying said ground speed signal to compensate for variations in system tolerances.

14. An automatic control system in accordance with claim 10, which further comprises visual indicator means coupled to said pressure sensing means and responsive to said electrical liquid pressure signal for visually indicating the pressure of the liquid at said nozzles.

15. An automatic control system in accordance with claim 14, which further comprises switch means coupled between said visual indicator means and said pressure sensing means and said programming means for enabling said visual indicator means to selectively indicate the pressure of the liquid at said nozzles and the magnitude of said modified ground speed signal.

16. An automatic control system in accordance with claim 10, which further comprises means coupled to said programming means for preventing said modified ground speed signal from attaining a characteristic which corresponds to a vehicular ground speed below a predetermined speed, whereby the pressure of the liquid at the nozzles is maintained at least equal to a predetermined threshold level when the vehicular spreader is traveling at relatively slow speeds.

17. An automatic control system in accordance with claim 10, which further comprises alarm means; and sensing means coupled between said control valve means and said alarm means for sensing when said control valve means is at an extreme position and activating said alarm means.

18. An automatic control system in accordance with claim 10, which further comprises means coupled to said ground speed measuring means and responsive to said electrical ground speed signal for generating an electrical area signal representative of the area sprayed by said sprayer; and display means responsive to said electrical area signal for visually displaying the amount of area sprayed.

19. An automatic control system for use with a vehicular liquid sprayer of the type which pumps the liquid to be sprayed at a desired pressure to a plurality of nozzles which dispense the liquid at a predetermined desired density relative to the area being sprayed, said density being a function of the ground speed of the vehicular sprayer and a plurality of liquid spraying parameters including the rate of flow of liquid, the width covered by each nozzle, and the size of each nozzle, said control system comprising: means for sensing the pressure of the liquid supplied to said nozzles and developing a corresponding electrical liquid pressure signal; means for measuring the ground speed of said vehicular sprayer and developing a corresponding electrical ground speed signal; nozzle width attenuator means coupled to said ground speed sensing means for selectively modifying said ground speed signal to obtain a modified ground speed signal having a magnitude which corresponds to the width covered by each said nozzle required to obtain said density; rate of flow attenuator means coupled to said nozzle width attenuator means for further selectively modifying said ground speed signal to obtain an attenuated ground speed signal having a magnitude which also corresponds to the rate of flow of liquid required to obtain said density; nozzle size attenuator means coupled to said rate of flow attenuator means for further selectively modifying said ground speed signal to obtain an attenuated ground speed signal having a magnitude which also corresponds to the nozzle size required to obtain said density; means responsive to said liquid pressure signal and said attenuated ground speed signal for generating a corresponding valve control signal; and control valve means operatively coupled to said nozzles and responsive to said valve control signal for adjusting the rate of flow of said liquid to said nozzles to maintain the pressure of the liquid at the nozzles at a level which corresponds to said desired density, whereby the vehicular liquid sprayer is automatically adjusted to maintain the system pressure at the nozzles at the level which corresponds to the selected rate of flow, nozzle width, nozzle size, and variations in the ground speed of the sprayer and fluctuation in the pressure of the liquid supplied to the nozzles to thus spray the liquid at the desired density.

20. An automatic control system in accordance with claim 19, which further comprises: means coupled to said ground speed measuring means and responsive to said ground speed signal for developing a digital area signal representative of the total area sprayed with said liquid; and visual indicator means responsive to said digital area signal for visually displaying the total area sprayed with said liquid.

21. An automatic control system in accordance with claim 20 in which said digital area signal developing means includes a multiplier responsive to said modified ground speed signal for generating a pulse signal having a frequency which varies systematically in accordance with said modified ground speed signal; and further comprises a programmable divider circuit responsive to said pulse signal for generating said digital area signal, said programmable divider circuit including a multistage binary counter coupled to a diode matrix having a selector switch connected to the output of said matrix for selecting the output of said divider circuit which corresponds to the number of nozzles being used by said sprayer.

22. A vehicular liquid sprayer of the type which pumps the liquid to be sprayed at a desired pressure to a plurality of nozzles which dispense the liquid at a predetermined desired density relative to the area being sprayed, said density being a function of a plurality of liquid spraying parameters which may vary from one spraying application to another or from time to time during a given spraying application, said control system comprising: means for sensing the pressure of the liquid supplied to said nozzles and developing a corresponding first electrical signal; means for measuring the ground speed of the said vehicular sprayer and developing a corresponding second electrical signal; programming means responsive to one of said first and second electrical signals for selectively modifying said one electrical signal to obtain a modified electrical signal having a characteristic which corresponds to the values of at least two of said liquid spraying parameters required to obtain said desired density; means responsive to the other one of said first and second electrical signals and to said modified electrical signals for generating a corresponding valve control signal; and control valve means operatively coupled to said nozzles and responsive to said valve control signal for adjusting the rate of flow of said liquid to said nozzle to maintain the system pressure at the nozzle at the level which corresponds to the selected values of the liquid spraying parameters to thus spray the liquid at the desired density.

23. An automatic control system in accordance with claim 22, in which said programming means comprises a plurality of series-connected attenuators coupled to said valve control signal generating means, each said attenuator respectively associated with one of said liquid spraying parameters.

24. An automatic control system in accordance with claim 23, in which each said attenuator includes a voltage divider network having a single-pole, multi-position switch with a fixed resistance connected between each two adjacent switch positions and a movable contactor for selecting any of said switch positions, and which further include an operational amplifier having its non-inverting input terminal connected to said movable contactor and its inverting input terminal connected to its output terminal to form a voltage follower.

25. An automatic control system in accordance with claim 22, which further comprises calibrating means for generating a preset reference ground speed signal; and switching means coupled to said calibrating means and said programming means for selectively coupling said preset reference ground speed signal to said programming means, whereby a preset ground speed may be simulated irrespective of the particular speed at which the vehicular liquid sprayer is traveling so that the system may be calibrated to a standard ground speed.

26. An automatic control system in accordance with claim 25, in which said calibrating means comprises a crystal-controlled oscillator and a digital divider network for generating a pulse train signal having a predetermined frequency.

* * * * *